United States Patent [19]

Harper

[11] Patent Number: 5,037,304

[45] Date of Patent: Aug. 6, 1991

[54] INTEGUMENTARY CLOTHING FOR STIMULATING THE SUBCONSCIOUS REFLEXIVE MOVEMENT OF A CHILD'S HANDS

[76] Inventor: Patricia L. Harper, 11227 N. 58th Ave., Glendale, Ariz. 85304

[21] Appl. No.: 488,211

[22] Filed: Mar. 5, 1990

[51] Int. Cl.⁵ .............................................. G09B 19/00
[52] U.S. Cl. ......................................... 434/258; 2/323; 446/28
[58] Field of Search .................. 434/258, 247, 236; 446/28, 26; 2/338, 323, 324, 325, 326, 327, 328, 329, 330, 331, 332, 333, 334

[56] References Cited

U.S. PATENT DOCUMENTS

| | | | |
|---|---|---|---|
| 672,002 | 4/1901 | Katz | 2/327 |
| 1,694,735 | 12/1928 | Eskridge | 2/324 |
| 3,184,883 | 5/1965 | McCook | 446/28 |
| 3,238,661 | 3/1966 | Herer et al. | 446/28 |
| 3,579,639 | 5/1971 | Faulkner | 2/326 X |
| 4,262,550 | 5/1987 | O'Donnell | 446/26 X |
| 4,776,049 | 10/1988 | Perron | 446/26 X |
| 4,776,800 | 10/1988 | Anderson | 434/247 |
| 4,850,922 | 7/1989 | Harris | 446/28 X |

FOREIGN PATENT DOCUMENTS 630353 12/1961 Italy .......................................... 2/326

Primary Examiner—Richard J. Apley
Assistant Examiner—Rachel M. Healey
Attorney, Agent, or Firm—Tod R. Nissle

[57] ABSTRACT

Integumentary clothing for stimulating the subconscious reflexive movement of a child's hands. The clothing stimulates movement of a child's hands from the stomach toward the mouth and shoulders of the child. The child locates the clothing visually and by the sense of touch. The clothing is moved by the child in a direction which permits natural, relaxed movement of the child's hand and arm.

5 Claims, 2 Drawing Sheets

INTEGUMENTARY CLOTHING FOR STIMULATING THE SUBCONSCIOUS REFLEXIVE MOVEMENT OF A CHILD'S HANDS

FIELD OF THE INVENTION

This invention relates to clothing.

More particularly, the invention relates to integumentary clothing for stimulating the subconscious reflexive movement of the hands and arms of a child to promote development cf the tactile senses and the muscular coordination of the child.

During the development of the muscular system of a young child, one of the first acquired muscular-skeletal movements is movement of the hand from the waist to the mouth of the child. This movement of the hand is important in enabling the child to feed itself, first from the mother's breast and then from the bottle. As the child grows older, this learned movement, which for young children is basically a subconscious or reflexive movement, is used to place a variety of objects in the child's mouth. Being able to facilitate the development of the hand-eye muscular coordination of a child while minimizing the number of objects which make their way into the child's mouth is a desired objective because of the number of injuries which occur when young children inject safety pins, staples and other objects. Further, in order to facilitate development of the muscular coordination of the hand and arm of a child, it is preferred that the child be encouraged to move the hand and arm in a natural path of travel which is comfortable to the child.

Accordingly, it would be highly desirable to provide improved apparatus for stimulating the subconscious reflexive movement of the hands and arms of a child to promote development of the tactile senses and of the muscular coordination of the child while providing a distraction for the child which tends to minimize the number of objects which the child puts in his mouth.

It would also be highly desirable to provide improved apparatus which would encourage movement of a child's hand and arm along a natural, comfortable path of travel.

Therefore, it is an object of the invention to provide an improved apparatus for stimulating the subconscious reflexive movement of the hands and arms of a child to promote development of the tactile senses and of the muscular coordination of the child.

Another object of the invention is to provide improved apparatus of the type described which facilitates the development of the muscular coordination of the child while permitting the hand and arm to move in a natural path across the front of the child.

A further object of the invention is to provide improved apparatus of the type described which is worn as integumentary clothing, which is visible to a child, which functions as a toy, and which directs a child's hand away from the mouth of the child toward a shoulder of the child.

Still another object of the invention is to provide integumentary clothing which can be slidably moved over and conceal suspenders worn by a child.

BRIEF DESCRIPTION OF THE DRAWINGS

These and other, further and more specific objects and advantages of the invention will be apparent to those skilled in the art from the following detailed description thereof, taken in conjunction with the drawings, in which.

SUMMARY OF THE INVENTION

Figure 1:
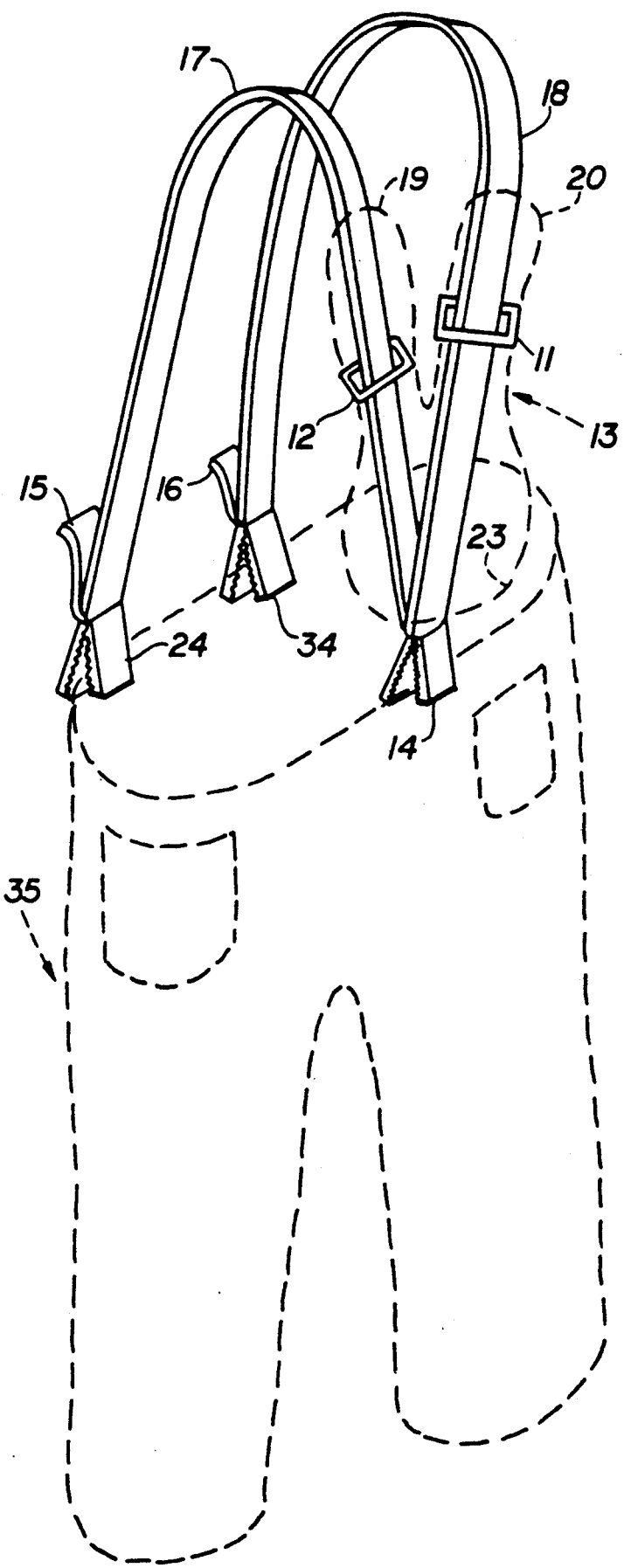
FIG. 1 is a perspective view of apparatus constructed in accordance with the principles of the invention.

Briefly, in accordance with my invention, I provide integumentary clothing for stimulating the subconscious reflexive movement of a child's hand. The clothing includes a first suspender strap extending from the back of the child, over a shoulder of the child and to the front of the child; a second suspender strap extending from the back of the child, over the other shoulder of the child and to the front of the child, the first and second suspender straps coterminating at a selected point at the front of the child; a fabric structure positioned at the front of the child and including a first portion connected to at least one of the first and second suspender straps and including a second pliable portion connected to the first portion; and, means to slidably connect the second pliable fabric portion to at least one of the first and second suspender straps such that the second pliable portion can be slidably moved between at least two operative positions, a first operative position and a second operative position. In the second operative position the pliable portion is slidably moved along one of the first and second suspenders in a selected direction of travel. The second pliable portion is shaped, contoured and dimensioned to be readily manually grasped between the fingertips and the palm of at least one hand of the child. The second pliable portion can be shaped, contoured and dimensioned such that when the second portion is in the second operative position, at least a section of the second portion can be manually inserted by the child in the child's mouth. The second pliable portion can also be shaped, contoured and dimensioned such that when the second portion is in the second operative position, the second portion is positioned below the chin of the child, requiring the child to release the second portion to move the hand grasping the second portion from the second portion to the child's mouth.

In another embodiment of the invention I provide integumentary clothing for stimulating reflexive movement of a child's hand from the front of the child's body to the child's mouth. The integumentary clothing includes a fabric structure including a first portion and a second pliable portion connected to the first portion; means for securing the first portion to the child's body in position at the front of the child's body; means connected to the second pliable portion for slidably moving the second pliable portion between at least two operative positions, a first operative position, and a second operative position with the pliable portion slidably moved from the first operative position in a direction of travel away from the waist of the child and toward the mouth of the child, at least a section of the second portion being positioned adjacent the mouth of the child when the second portion is in the second operative position; and, means for securing in a selected position at the front of the body of the child said means for slidably moving the second portion. The second portion is shaped, contoured and dimensioned to be readily manually grasped between the fingertips and palm of at least one hand of the child.

DESCRIPTION OF THE PREFERRED EMBODIMENTS

Figure 2:
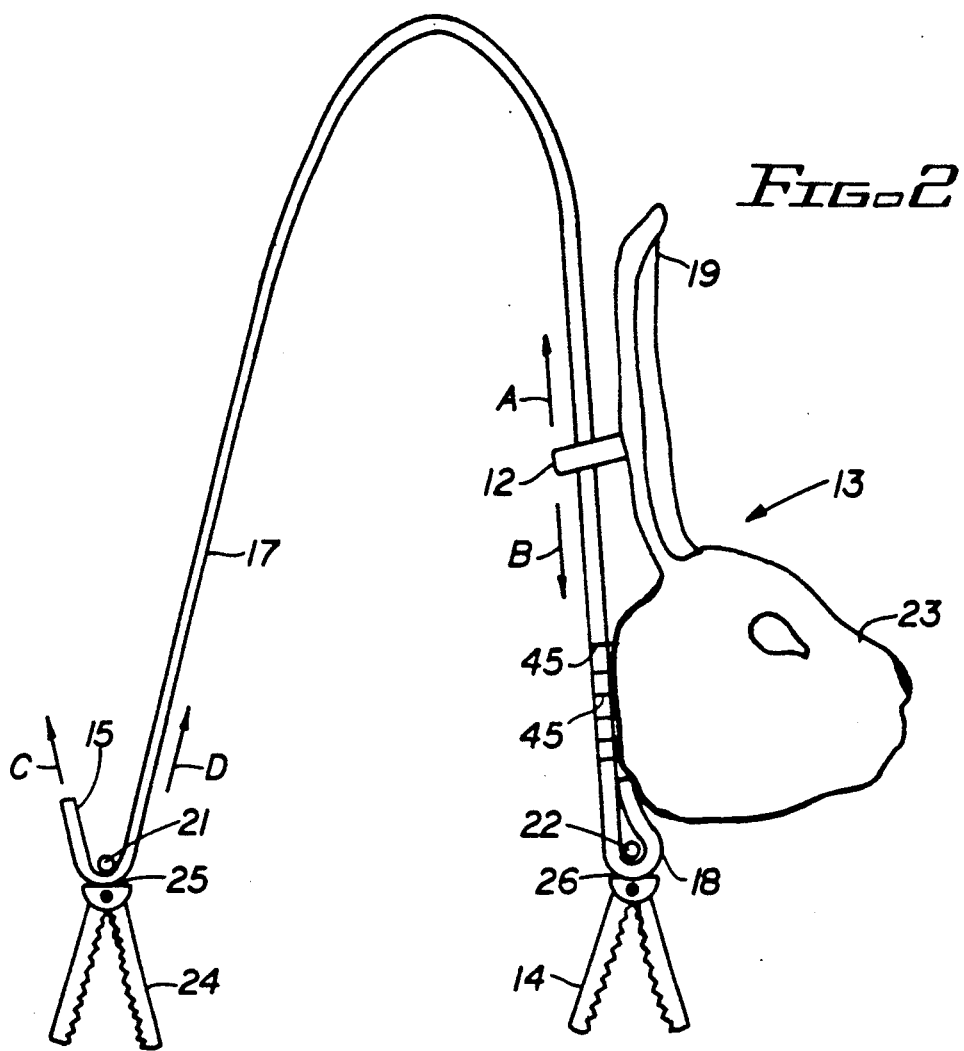
FIG. 2 is a side view of a portion of the apparatus of FIG. 1 illustrating further construction details thereof; and, FIG. 3 is a perspective view of an alternate embodiment of the invention.

Turning now to the drawings, which depict the presently preferred embodiments of the invention for the purpose of illustrating the practice thereof and not by way of limitation of the scope of the invention, and in which like reference characters refer to corresponding elements throughout the several views, FIGS. 1 and 2 illustrate the integumentary clothing constructed in accordance with the principles of the invention and including a first suspender strap 17 and a second suspender strap 18. The straps 17, 18 each extend from the back of the child, over a shoulder of the child and to the front of the child. Fabric structure 13 is positioned at the front of the child and includes a first portion 23 connected to straps 17 and 18 by threads or stitching 45. The second elongate pliable portion or ear 19 of fabric structure 13 is connected to the first portion 23. Rings 11 and 12 each circumscribe a strap 17, 18 and are each stitched to or otherwise connected to portions 20, 19, respectively. Elongate pliable portion or ear 20 is also connected to first portion 23. In FIGS. 1 and 2, fabric structure 13 comprises a stuffed rabbit head including a pair of elongate pliable ears. When a child grasps an ear 19, 20 with a hand, the ear and ring 11, 12 attached to the ear, can be slid along a strap 17, 18 in the directions indicated by arrows A and B in FIG. 2.

As shown in FIG. 1, straps 17 and 18 coterminate at the front of a child's body at a clip 14. At the back of the child, strap 17 terminates at clip 24 and strap 18 terminates at clip 34. Clips 14, 24, 34 are presently alligator clips which attach to the waist or top of pants 35 worn by the child. Velcro ®, safety pins, snaps or any other desired fastening means can be used in place of or in combination with clips 14, 24, 34 to secure suspender straps 17, 18 in position at the front and back of the child. As shown in FIG. 2, each clip 14, 24, 34 is identical and includes a pin or shaft mounted in the housing of the clip. End 15 slidably, frictionally passes through a slot 25 formed in the clip housing intermediate pin 21 and the jaws of clip 24. Similarly, strap 17 slidably, frictionally passes into a slot 26 formed in clip 14 intermediate pin 22 and the jaws of clip 14. The length of strap 17 can be adjusted by pulling end 15 through slot 25 in the direction of arrow C or arrow D. The length of strap 18 can be similarly adjusted by pulling end 16 through a slot formed in clip 34. The structure of each clip 14, 24, 34 is identical to the structure of the remaining clips 14, 24, 34. Any other prior art structure or means can be used to adjust the length of each strap 17, 18.

In use, clips 14, 24, 34 are attached to the top of pants 35 worn by a baby or young child. Strap 17 extends from the back of the child over the child's right shoulder and to the front of the child. Strap 18 extends from the back of the child over the child's left shoulder and to the front of the child. When the child is very young, it gradually begins to see fabric structure 23 and to detect structure 23 with the sense of touch in his fingertips. After the child grasps an elongate portion 19 and 20, the child discovers that a portion 19 can be manually grasped and slid in the directions indicated by arrows A and B in FIG. 2. Since young children subconsciously reflexively grasp objects and attempt to move objects, the ability to slide portion 19 along strap 17 facilitates the development of the child's motor skills.

Positioning of strap 17 so that a portion of strap 17 (or of strap 18) extends from the center front waist to the child's shoulder is important in the use of the invention. The movement of the hand from the waist to the opposite shoulder is a movement which is more natural and requires less effort than moving the hand from the waist to its associated shoulder. For example, moving the right hand from a position centered over the stomach to the left shoulder is a much more natural movement than moving the right hand from the stomach to the right shoulder. Moving the right hand from the waist up toward the left shoulder also causes both the right hand and entire right arm to move. Moving the right hand from the stomach to the right shoulder can be accomplished without moving the upper part of the right arm toward or away from the side of the body. Accordingly, the V-shaped suspender illustrated in FIG. 1 more naturally facilitates the use of the invention by a child.

Fabric structure 13 typically comprises a stuffed animal or portion thereof. In FIG. 2, fabric structure 13 comprises a rabbit head. The ears of the rabbit are portions 19 and 20. The head of the rabbit comprises portion 23. Structure 13 preferably extends outwardly away from the child's stomach at least one-half inch, preferably one inch or more, to facilitate the child's visually locating structure 13. Fabric portion need not, however, be stuffed, as long as a portion of the structure 13 is slidably secured to a suspender strap 17 or 18. A particular advantage of the fabric structure 13 is that it substantially conceals straps 17 and 18 extending over the front of the child. Fabric structure 13 can, in part or in whole, be manufactured from natural or synthetic fibers or materials, from plastic, from rubber, or from any other desired material as long as portions 19 and 20 are pliable and can be moved along straps 17 and 18 and are shaped, contoured and dimensioned to be readily manually grasped by at least one hand of a child.

Location of portions 23, 19, and 20 at the center front of a child's body is also important in use of the invention. When resting, playing, or in a reclining position, the hands of a baby or young child typically are often naturally reflexively subconsciously positioned over the center of the child's stomach. Consequently, the central location of fabric structure 13 when structure 13 is attached to the V suspender straps 17 and 18 facilitates the child's discovering and utilizing portions 23, 19 and 20. In addition, the V suspender straps 17 and 18 cause a child's hand to move upwardly toward the child's mouth when the portions 19 and 20 are moved in the direction of arrow A in FIG. 2. Portions 19 and 20 can be shaped and dimensioned such that when rings 11 and 12 are slid in the direction A to a selected point, the tips of portions 19 and 20 can be put in the child's mouth. This feature is desirable when a baby is teething. Alternately, portions 19 and 20 can be shaped and dimensioned such that when rings 11 and 12 are moved in the direction of arrow A to their farthest extent of travel along straps 17 and 18 the upper or distal tips of portions 19 and 20 cannot be inserted in the mouth of the child. After a baby or young child has grasped and slid a portion 19, 20 along a strap 17, 18 the child tends later to repeatedly subconsciously reflexively grasp and slide portions 19, 20 along straps 17 and 18.

Figure 3:
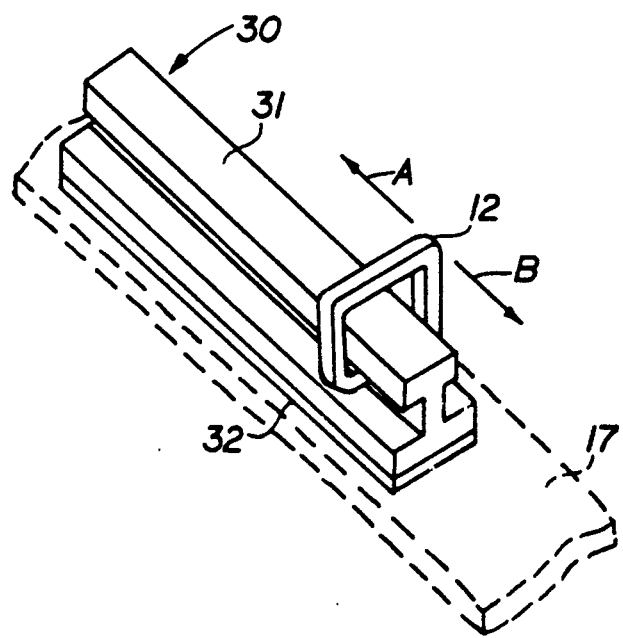

The slide 30 of FIG. 3 includes rail 31 provided with contact adhesive layer 32. Ring 12 can be slidably mounted on and move along rail 31 in the directions of arrows A and B as indicated in FIG. 3. Adhesive 32 can be utilized to attach rail 31 to suspender strap 17 such that the longitudinal axis of rail 31 is vertically oriented. Ring 11 or 12 can slidably move along rail 31 instead of along strap 17. Mounting ring 12 on rail 31 instead of on strap 17 prevents ring 12 from fraying and wearing strap 17. If desired, adhesive 32 can be pressed directly onto a shirt or other clothing worn by a child to affix rail 31 directly to the shirt. When rail 31 is vertically orientated and is affixed to a shirt, then portion 23 can be attached to the shirt or to the child's pants with safety pins or other means to anchor portion 23 on the shirt. After portion 23 is anchored below rail 31 to the shirt, then portion 19 and ring 12 can be slid along rail 31 in the direction of arrows A and B. If the child is not wearing a shirt, then straps or other desired means can be used to anchor or hold slide 30 and portion 23 in position against the front of the child's body. Fabric structure 13 is omitted from FIG. 3 for the purpose of clarity. If structure 13 were illustrated in FIG. 3, portion 19 would be connected to ring 12 in the same manner that portion 19 is attached to ring 12 in FIG. 2.

In FIG. 2, portion 23 is secured to the lower front parts of suspender straps 17 and 18. For the purposes of this specification and the appended claims, attaching portion 23 to clip 14 constitutes attaching portion 23 to at least one of straps 17 and 18.

Straps 17 and 18 are preferably interconnected such that a single continuous strap is formed which extends from clip 24, through slot 26 in clip 14, and to clip 34. The portion of strap 17 or 18 passing through slot 26 preferably readily slidably passes through slot 26 such that the overall length of the strap extending from clip 24 through slot 26 and by then sliding the appropriate end 15, 16 through a slot 25 in clip 24 or through a slot formed in clip 34, respectively.

Having described my invention in such terms as to enable those skilled in the art to understand and practice it, and having identified the presently preferred embodiments thereof,

I claim:

1. Integumentary clothing for stimulating the subconscious reflexive movement of a child's hands, said clothing including
    (a) a first suspender strap extending from the back of the child, over one shoulder of the child and to the front of the child;
    (b) a second suspender strap extending from the back of the child, over the other shoulder of the child and to the front of the child, said first and second suspender straps coterminating at a selected point at the front of the child;
    (c) a fabric structure positioned at the front of the child and including
        (i) a first portion connected to at least one of said first and second suspender straps;
        (ii) a second pliable portion connected to said first portion;
    (d) means to slidably connect said second pliable fabric portion to ar least one of said first and second suspender straps such that said second pliable portion can be slidably moved between at least two operative positions,
        (i) a first operative position, and
        (ii) a second operative position with said pliable portion slidably moved along said one of said first and second suspenders in a selected direction of travel;
    said second pliable portion being shaped, contoured and dimensioned to be readily manually grasped between the fingertips and palm of at least one hand of the child.

2. The integumentary clothing of claim 1 wherein said second pliable portion is shaped, contoured and dimensioned such that when said second portion is in said second operative position, at least a section of said second portion can be manually inserted by the child in the child's mouth.

3. The integumentary clothing of claim 1 wherein said second pliable portion is shaped, contoured and dimensioned such that when said second portion is in said second operative position, said second portion is positioned below the chin of the child, requiring the child to release said second portion to move the hand grasping said second portion from said second portion to the child's mouth.

4. Integumentary clothing for stimulating the subconscious reflexive movement of a child's hand from the front of the child's body toward the child's mouth, said clothing including
    (a) a fabric structure including
        (i) a first portion, and
        (ii) a second pliable portion connected to said first portion;
    (b) an elongate member extending over the front of the child
        (i) intermediate the waist and shoulders of the child, and
        (ii) upwardly from the waist toward the shoulders of the child;
    (c) a sliding member attached to said second pliable portion and shaped and dimensioned to slidably engage said elongate member such that said sliding member and said second pliable portion can be moved between at least two operative positions,
        (i) a first operative position, and
        (ii) a second operative position with said sliding member slidably moved from said first operative position along said elongate member in a direction of travel away from the waist of a child, at least a section of said second portion being positioned adjacent the mouth of the child when said second portion is in said operative position,
    said second pliable portion being shaped, contoured and dimensioned to be readily manually grasped between the fingertips and palm of at least one hand of the child; and,
    (d) means for securing said first portion in position at the front of the child's body to at least one of the pair comprising
        (i) said elongate member, and
        (ii) clothing worn by said child other than said integumentary clothing.

5. The integumentary clothing of claim 1, wherein said selected point is at the front waist of the child such that when said second pliable portion is moved in said selected direction of travel, said second pliable portion moves from the waist upwardly and outwardly toward a shoulder of the child, said upward and outward movement of said second portion facilitating the natural upward movement of the hand of the child grasping said second pliable portion.

* * * * *